(12) United States Patent
Jiang et al.

(10) Patent No.: US 7,910,501 B2
(45) Date of Patent: Mar. 22, 2011

(54) SHEET MOLDING MATERIAL FOR FUEL CELL BIPOLAR PLATE, METHOD OF PRODUCING SAME AND BIPOLAR PLATE OR FUEL CELL

(75) Inventors: Jianye Jiang, Osaka (JP); Tetsuya Harada, Osaka (JP)

(73) Assignee: Dainippon Ink and Chemicals, Inc., Itabashi-ku, Tokyo (JP)

( * ) Notice: Subject to any disclaimer, the term of this patent is extended or adjusted under 35 U.S.C. 154(b) by 631 days.

(21) Appl. No.: 11/722,032

(22) PCT Filed: Dec. 16, 2005

(86) PCT No.: PCT/JP2005/023153
§ 371 (c)(1),
(2), (4) Date: Jun. 18, 2007

(87) PCT Pub. No.: WO2006/068051
PCT Pub. Date: Jun. 29, 2006

(65) Prior Publication Data
US 2008/0095994 A1   Apr. 24, 2008

(30) Foreign Application Priority Data
Dec. 20, 2004   (JP) ................... 2004-367531

(51) Int. Cl.
*B32B 27/04* (2006.01)
*B32B 5/16* (2006.01)
*D04H 1/00* (2006.01)

(52) U.S. Cl. ..... 442/110; 442/111; 442/417; 428/304.4; 428/317.9; 428/212; 427/115

(58) Field of Classification Search .................. 442/110, 442/111, 417; 428/304.4, 317.9, 212; 427/115
See application file for complete search history.

(56) References Cited

U.S. PATENT DOCUMENTS

| | | | |
|---|---|---|---|
| 2003/0143452 A1 | 7/2003 | Ito et al. | |
| 2003/0232185 A1* | 12/2003 | Shimamura et al. | 428/323 |
| 2005/0001352 A1* | 1/2005 | Ma et al. | 264/241 |
| 2006/0021544 A1* | 2/2006 | Kriksunov | 106/14.05 |
| 2007/0128464 A1* | 6/2007 | Jang | 428/688 |

FOREIGN PATENT DOCUMENTS

JP   5-307967 A   11/1993

(Continued)

OTHER PUBLICATIONS

Informal comments of applicant in international phase for PCT Application—PCT/JP2005/023153.

(Continued)

*Primary Examiner* — Norca L Torres-Velazquez
(74) *Attorney, Agent, or Firm* — Westerman, Hattori, Daniels & Adrian, LLP (57) ABSTRACT

The present invention offers sheet molding material for obtaining a thin fuel cell bipolar plate with excellent conductivity and thickness precision, production method thereof, and a fuel cell bipolar plate made by molding the sheet molding material. It relates to sheet molding material for a fuel cell bipolar plate and production method thereof, wherein the sheet molding material has carbon particle layer on at least one surface of the resin sheet, and the percentage of particles of carbon layer in the sheet molding material is 70% to 90% by weight.

15 Claims, 5 Drawing Sheets

FOREIGN PATENT DOCUMENTS

| | | | |
|---|---|---|---|
| JP | 8-1853 A | | 1/1996 |
| JP | H8-1853 | * | 1/1996 |
| JP | 2000-133281 A | | 5/2000 |
| JP | 2001-15131 | * | 1/2001 |
| JP | 2001-15131 A | | 1/2001 |
| JP | 2001-122677 A | | 5/2001 |
| JP | 2002-198062 A | | 7/2002 |
| JP | 2003-89969 A | | 3/2003 |
| JP | 2003-223906 A | * | 8/2003 |
| JP | 2003-223906 A | | 8/2003 |
| JP | 2004-356091 A | | 12/2004 |
| WO | 2004-100296 A1 | | 11/2004 |

OTHER PUBLICATIONS

International Search Report of PCT/JP2005/023153, date of mailing: Feb. 28, 2006.

* cited by examiner

SHEET MOLDING MATERIAL FOR FUEL CELL BIPOLAR PLATE, METHOD OF PRODUCING SAME AND BIPOLAR PLATE OR FUEL CELL

TECHNICAL FIELD

The present invention relates to sheet molding material for bipolar plate for fuel cells such as phosphoric fuel cell used in automotive power source, portable power source, and emergency power source and so on, direct methanol fuel cell, and polymer electrolyte fuel cell, the method of producing same, and bipolar plate for fuel cell using the sheet molding material.

BACKGROUND ART

The so-called fuel cell that extracts the energy obtained from the electrochemical reaction between hydrogen and oxygen as electric power, is anticipated to be used widely in various kinds of applications such as portable equipment and automobiles. Generally, this fuel cell ensures substantial power and is made by laminating several tens to several hundreds of unit cells of basic configuration (hereinafter referred to as "unit cells") in series, each unit cell having a membrane electrode assembly (hereinafter referred to as "MEA") provided with electrode and a gas-diffusion layer, such as carbon paper on both surfaces of the electrolytic film, with at least fuel (such as hydrogen gas), oxidizing agent (air or oxygen) or cell on one face sandwiched between two bipolar plates on which coolant flow passages for cooling cells are formed.

Accordingly, "conductivity" for increasing the power generating efficiency of the fuel cell is required in the bipolar plates used in these fuel cells, and at the same time, the demand for "thinness" of bipolar plates is high because of the need for miniaturization of the fuel cell. Also, as mentioned above, for obtaining substantial power, the fuel cell generally makes use of a plurality of bipolar plates laminated in the thickness direction, Therefore, the bipolar plate itself is to be provided with high "thickness precision," the contact resistance between bipolar plate and MEA, and between fuel cells is to be reduced, and air tightness and watertightness in the packing and gaskets for various kinds of gas and liquid seals introduced in the fuel cell is anticipated to be ensured. From these aspects, a molding material with high conductivity, very thin and having high thickness precision suitable for production of bipolar plates is demanded. Moreover, from economic aspects, a method of production of bipolar plates at low cost and with high productivity is demanded.

In view of these reasons, after mixing conducting agent and thermoplastic resin, sheet forming material was made by a conventional method such as the extrusion molding method or the hot rolling method, and a method of molding this sheet molding material into the specified bipolar plate using a mold provided with flow passages for fuel and/or oxidizing agent has been proposed (for example, see patent documents 1 and 2).

However, during the kneading step of thermoplastic resin and conductive particles of graphite, for instance, which is used as conducting agent, and during the extrusion step of this mixture in these methods, strong shear force and compressive force are applied on the thermoplastic resin and the conducting agent. As a result, the conductive particles are converted to powder, the number of conductive particles increases, the contact resistance between the conductive particles increases, and the conductivity of the bipolar plate obtained by molding the sheet material decreases, which is a problem.

Moreover, if the ratio of conducting agent in the mixture is increased to above 80% by weight with the objective of improving the conductivity of the bipolar plate, larger shear force and compressive force are necessary in the kneading step, sheet making step and molding step of the mixture mentioned above. As a result, the conductive performance desired in the bipolar plate is difficult to achieve, and since conducting agent with high concentration is included, the workability becomes poor, and thin sheets cannot be obtained easily. Furthermore, a bipolar plate such as the one obtained by molding this sheet material has problems such as poor transferability of mold shape, defects in dimensional precision can occur easily, and thickness precision also becomes an issue.

Patent document 3 proposes a method of applying the so-called conductive paint dispersed uniformly with conductive fine particles such as graphite in epoxy resin on a non-woven fabric surface, as a method of obtaining conductive thin sheet without applying strong shear force or compressive force to the conducting agent.

However, according to this method, to uniformly apply a coat of epoxy resin with conductive fine particles uniformly dispersed therein on a non-woven fabric, the amount of conductive particles to be added must be reduced to about 35% to 60% and flowability must be ensured; with this amount of conductive particles, a conductivity of less than 200 mΩ·cm required for the bipolar plate for fuel cell cannot possibly be achieved.

Accordingly, high conductivity required for the bipolar plate for fuel cells was available in the conventional molding methods by sheet stamping, sheet rolling and blanking, but it was difficult to manufacture molding material suitable for production of thin bipolar plate with high thickness precision.

Also, a bipolar plate for fuel cell (for example, refer to patent document 4) obtained by heating and softening non-woven fabric including thermoplastic resin fiber of diameter 0.1 to 20 μm with conductive particles distributed uniformly therein, and molding it in the mold has been proposed. In this method, although a sheet molding material with a thickness of about 0.05 mm is obtained, since conductive particles are distributed within the non-woven fabric, thin sheet molding material thinner than this sheet cannot be obtained; thus, very thin bipolar plates cannot be obtained. Moreover, a step of making non-woven fabric once using thermoplastic resin fabric and conductive particles as raw materials has to be included; this results in disadvantages with regard to production efficiency, and furthermore, the thickness precision of the non-woven fabric thus obtained tends to be poor.

Patent document 1:
Japanese Unexamined Patent Application, First Publication No. 2001-122677
Patent document 2:
Japanese Unexamined Patent Application, First Publication No. 2002-198062
Patent document 3:
Japanese Unexamined Patent Application, First Publication No. 2003-89969
Patent document 4:
Japanese Unexamined Patent Application, First Publication No. 2004-356091

DISCLOSURE OF INVENTION

Accordingly, the present invention has the object of solving the problems in the prior art mentioned above. More specifically, it has the object of offering sheet molding material for obtaining fuel cell bipolar plate having excellent conductivity and high thickness precision, which can be made thinner than the conventional item, production method thereof, and bipolar plate for fuel cell molded by said molding material.

To resolve the technical problems mentioned above, the inventors earnestly carried out studies by preparing sheet molding material attaching conductive particles in layer form to the surface of resin sheet and molding this sheet molding material. The kneading step of resin and conductive particles was omitted, and the sheet too could be made under comparatively relaxed conditions. Since powder of conductive particles could be reduced to a very small amount, the inventors found that they could produce with good efficiency a thin fuel cell bipolar plate with high thickness precision having excellent conductivity.

That is, the present invention offers sheet molding material for fuel cell bipolar plate, wherein at least one surface of the resin sheet has a sheet molding material with one conductive particle layer made of particles, including conductive particles, and the content of conductive particles in the said sheet molding material is 70% to 95% by weight.

Also, the present invention offers a method of producing sheet molding material for fuel cell bipolar plate wherein step (1), step (2) and step (3) mentioned below are sequentially carried out for at least one of the surfaces of the resin sheet.

Step (1): Step of dispersing uniformly conductive particles on the surface of resin sheet Step (2): Step of attaching a part of the above-mentioned conductive particles on the above-mentioned resin sheet Step (3): Step of removing conductive particles that are not attached to the resin sheet in the above-mentioned Step (2).

Moreover, the present invention offers bipolar plate for fuel cell formed by molding the sheet molding material mentioned above.

When the sheet molding material of the present invention is used, fuel cell bipolar plate with excellent conductivity, small thickness and high thickness precision not present in the conventional item can be produced efficiently. The bipolar plate thus made can be used effectively in fuel cells in portable power source, automobile power source, emergency power source, and so on.

BRIEF DESCRIPTION OF THE DRAWINGS

FIGS. 4A and 4B are an embodiment of the present invention wherein graphite particles are dispersed on one surface.

(In FIG. 6, D: Direction of progress of precursor; P: Precursor.)

FIGS. 8A to 8C are conceptual sketches of each stage of the press pressurization of the laminated sheet molding material in the molten state of resin.

EXPLANATION OF REFERENCE NUMERALS

1—thermo-setting resin layer
2—layer other than thermo-setting resin layer of 1
3—composite sheet of thermo-setting resin
4—thermoplastic resin layer
5—layer other than thermoplastic resin layer of 4
3'—composite sheet of thermoplastic resin
3"—composite sheet of thermoplastic resin and thermoplastic resin.
6—resin sheet
7—graphite particle
8—spacer
9—squeegee board
10—calendar roll
7'—attached graphite particle
7"—non-attached graphite particle
11—thermally bonded part of resin sheet and graphite particle
12—bipolar plate
13—flow passage for gas or liquid
14—apex of rib part of bipolar plate

BEST MODE FOR CARRYING OUT THE INVENTION

The present invention is described in further detail below.

The sheet molding material for fuel cell bipolar plate according to the present invention, has at least one conductive particle layer on one surface of the resin sheet, and the content of conductive particles in the said sheet molding material is 70% to 95% by weight. As long as the content of the conductive particles is in the range mentioned above, the particle layer may be formed only on one surface of the sheet molding material, or it may be formed on both surfaces.

The sheet molding material of the present invention has conductive particles on the sheet surface (on one surface or both surfaces), and has one layer formed on it that is unevenly distributed in the thickness direction of the sheet. The cross section of the sheet molding material for fuel cell bipolar plate of the present invention is shown schematically in FIG. 7.

The resin sheet of the present invention may or may not have voids; however, if it does have voids, then the ratio of the conductive particles increases, and bipolar plate with excellent conductivity can be obtained. Even if the true specific gravity of the resin sheet is large (thickness of the resin sheet becomes the smallest), a sheet with large thickness can be used in the present invention, and the ease of handling of the obtained sheet molding material increases.

The existing position of voids and the shape of the voids in the resin sheet used in the present invention are not limited; the voids may exist within the resin sheet, or they may exist on the surface of the resin sheet. To facilitate the attachment of the conductive particles used, the voids should preferably exist as openings on the surface of the resin sheet. The area of the openings of voids on the surface of the resin sheet should preferably be large, while the areas of openings within the sheet should preferably be small. This ensures firmer attachment of the conductive particles to the resin sheet and is more preferable.

It is also preferable to select a shape of the conductive material to be used similar to the shape of the voids.

The preferred void fraction of the resin sheet should be between 30% and 90%, and more preferably between 50% and 85%, considering that a large amount of conductive particles may be inserted by the resin sheet, fixing of the conductive particles in the resin sheet is facilitated, and considering the handling characteristics of the resin sheet and the sheet molding material.

Here, the preferred void fraction of the resin sheet can be calculated by the formula (I).

Void fraction of resin sheet (%)=[1−(Actual volume of resin sheet)/(apparent volume of resin sheet)]× 100           (I)

The actual volume of resin sheet can be calculated by measuring the weight of the resin sheet and dividing this value by the specific gravity of the sheet. The apparent volume of the resin sheet can be calculated from the measured values of the apparent thickness, width, and length of the sheet. When voids are opened up on the surface of the resin sheet of the present invention, the apparent thickness is taken as the thickness between the upper and lower surfaces of the resin sheet.

The size of voids of the resin sheet is determined by considering the size of conductive particles to be used. That is, when large conductive particles are used, the voids of the resin sheet are to be large; when small conductive particles are used, the voids of the resin sheet are to be small.

In the present invention, the mean pore diameter of void should preferably be between 10 and 800 μm, and particularly more preferably between 50 and 500 μm from the range of mean particle diameters of the conductive particles described later.

If the mean pore diameter of voids is within this range, the conductive particles can be uniformly dispersed on the resin sheet. Moreover, very few conductive particles fall off from the voids of the resin sheet into which they are inserted, and a sheet molding material of uniform quality can be obtained.

Here, the mean pore diameter of void is taken as the diameter of the circumscribed circle of the enlarged image of the sheet surface obtained using stereoscopic microscope and the like, and is the weighted average value of mean pore diameter of void that exists in a 10-mm square sheet. In this case, the smallest diameter of the inscribed circle of the through-penetrating part is used, when the void penetrates in the thickness direction of the sheet.

The weight of the resin sheet used in the present invention should preferably be 5 to 300 g/m$^2$ and particularly, should more preferably be 5 to 200 g/m$^2$. If the weight of the resin sheet is in the range of 5 to 300 g/m$^2$, sheet molding material with optimum weight of conductive particles and optimum weight ratio of resin sheet as mentioned later, can be obtained. Using such a resin sheet, thin bipolar plate for fuel cell with small variation in thickness can be molded.

The thickness of the resin sheet should preferably be 5 to 300 μm and particularly, should more preferably be 50 to 200 μm. If the thickness of the resin sheet is in the range of 5 to 300 μm, the thickness precision of the bipolar plate obtained after molding can be maintained easily, and conductivity of the bipolar plate finally obtained can be favorably ensured. If a thicker resin sheet is used, the contact points of the conductive particles cannot be ensured adequately when the bipolar plate shape is molded by laminating a plurality of sheets, and the conductivity of the bipolar plate reduces.

Thermo-setting resin and thermoplastic resin are examples of the resin in the resin sheet used in the present invention. Thermo-setting resins that can be used include for example, phenol resin, epoxy resin, vinyl ester resin, urea resin, melamine resin, unsaturated polyester resin, silicone resin, diallyl phthalate resin, maleimide resin, polyimide resin and so on.

Figure 1:
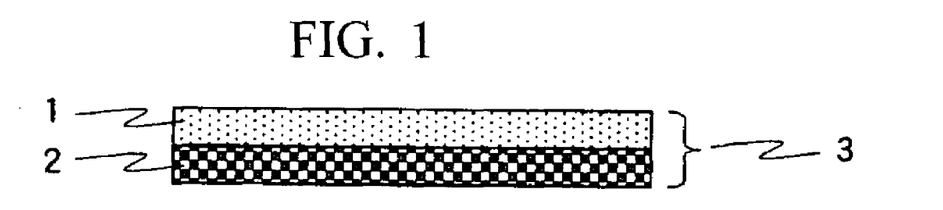
FIG. 1 is a conceptual sketch of two kinds of thermo-setting resin composite sheet.

Thermo-setting resin may be made not only from one kind of resin, but also two or more kinds of resin may be mixed, and two or more kinds of resin may be molded into layers and used as a composite sheet (see FIG. 1). Sheets made from thermo-setting resin may be obtained by diluting thermo-setting resin and catalytic hardener with a solvent to prepare a resin solution, applying this solution on release paper and the like, and then removing the solvent from the coating film by heating and reducing pressure. However, this resin sheet should be hardened in the final bipolar plate molding step, and its use in the uncured state, or in the uncured state and in the so-called B-stage state, goes without saying.

On the other hand, thermoplastic resin may include, for instance, polyethylene, polypropylene, cyclo-olefine polymer, polystyrene, cyclo-olefine polymer, syndiotactic polystyrene, polyvinyl chloride, ABS resin, polyamide resin, polyacetal, polycarbonate, polyphenylene ether, denatured polyphenylene ether, polyethylene terephtalate, polytrimethylene terephtalate, polybutylene terephtalate, polycyclohexylene terephthalate, polyphenylene sulfide, polythioether sulfone, polyetheretherketone, polyarylate, polysulfone, polyether sulfone, polyether amide, polyamide-imide, thermoplastic polyimide, liquid crystal polymer, polytetrafluoroethylene copolymer, fluororesins such as polyvinylidene fluoride, fully aromatic polyester, semi aromatic polyester, polyactide, thermoplastic elastomers such as polyester and polyester elastomer, polyester and polyether elastomer.

Figure 2:
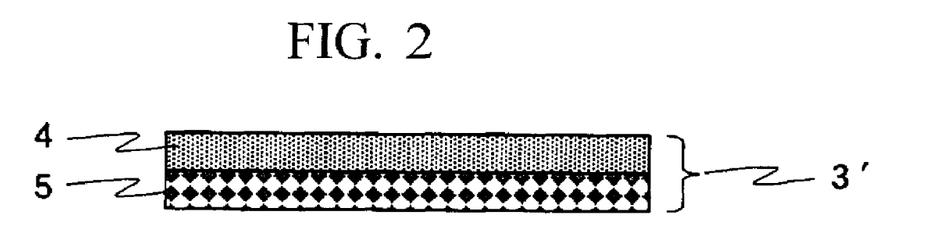
FIG. 2 is a conceptual sketch of two kinds of thermoplastic resin composite sheet.

Similar to thermo-setting resin, thermoplastic resins may be made not only from one kind of resin, but also two or more kinds of resin may be mixed, and two or more kinds of resin may be molded into layers and used as a composite sheet (see FIG. 2).

Sheets made from thermoplastic resin can be obtained normally by passing molten resin in an extruder through a slit-shaped die of the specified thickness and extruding it.

Figure 3:
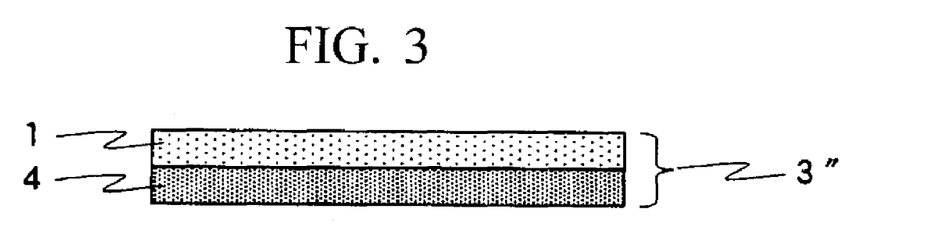
FIG. 3 is a conceptual sketch of composite sheet of thermo-setting resin and thermoplastic resin.

A sheet formed by mixing thermo-setting resin and thermoplastic resin, or a composite sheet formed by two or more kinds of resin in layer form may be used as the resin sheet of the present invention (see FIG. 3). If the thermo-setting resin is in liquid form, it can also be used as the adhesive between the resin sheet and the conductive particles Furthermore, reinforcing materials such as fibers can be added to each of the resin sheets mentioned above. Fibers that can be used as reinforcing materials include glass fiber, carbon fiber, metallic fiber or fiber made of resin.

The thermoplastic resin mentioned above, can be appropriately selected and used according to the heat resistance and durability for the operating temperature of each fuel cell.

For example, when it is used in phosphoric fuel cell, polyphenylene sulfide resin (hereinafter referred to as PPS) is preferred considering corrosion resistance and heat resistance. When it is used in polymer electrolyte type fuel cell, or in the so-called direct methanol fuel cell that uses methanol as fuel, PPS or polypropylene is preferred considering corrosion resistance and mechanical strength. PPS has low melting viscosity and high affinity with conductive particles; it can also enhance the conductivity and mechanical strength of the molded product, so it is particularly preferred.

From the results of studies on inventors until now, it was found that to achieve a specific volume resistance of less than a few hundred mΩ·cm required in bipolar plate for fuel cell using conductive particles and resin which is an insulator, conductive particles of more than 70% by weight were necessary.

Theoretically, to increase the weight ratio of the conductive particles using resin sheet with high true specific gravity and with small diameter of conductive particles, the thickness of the resin sheet has to be made small.

Considering these points, the resin in the resin sheet used in the present invention should preferably be thermoplastic resin by considering the following points: the mechanical strength of thermoplastic resin is generally higher than the mechanical strength of uncured thermo-setting resin; and the handling of sheet molding material of the present invention is easier.

Specific examples of resin sheet used in the present invention include for example, composite resin sheet, composite fiber cloth, non-woven fabric and so on. From these, non-woven fabric with excellent handling characteristics and with high void fraction is preferred.

The variation in weight and thickness of non-woven fabric is affected by the thickness and preferred void fraction, but generally, this is said to be between ±5% to ±10%. Within the range of thickness and preferred void fraction of the resin sheet of the present invention, even if the variation in thickness of the non-woven fabric itself exists to some extent, the final thickness precision of the bipolar plate can be adequately ensured during the step of manufacturing the sheet molding material or manufacturing the bipolar plate using the sheet molding material.

Generally, non-woven fabric refers to a structure wherein fibers are connected and interwoven either by a chemical method, a mechanical method, or a combination of these methods.

The non-woven fabric mentioned above, may be any kind of non-woven fabric; for example, it may be joined by adhesive, or joined mechanically by using a needle punch and the like, or it may be joined by direct melting such as by spun bond. Non-woven fabric that has been joined by direct melting such as by spun bond is preferred because of the good thickness precision of non-woven fabric.

Fibers that form the non-woven fabric are not limited to any type, but thermoplastic resin fibers are preferred since thermoplastic resin can be easily made into fibers. As thermoplastic resin for the thermoplastic resin fibers, the example illustrated as thermoplastic resin of the resin sheet mentioned above, can be used.

A combination of a plurality of fibers of different compositions may also be used. In this case, fibers that differ in melting point by more than 10° C. and more preferably by more than 30° C. are preferable. Particularly, a non-woven fabric using fibers wherein the fiber core has a high melting point, while the sheath part has a low melting point are preferred. If this non-woven fabric is used, when attaching the conductive particles dispersed on the surface to the non-woven fabric, by melting the low melting point fiber only while retaining the form of the high melting point fiber of the core, the conductive particles can be easily made to attach to the fiber surface of the non-woven fabric.

Non-woven fabric including carbon fibers may be used as the sheet molding material of the present invention. By using carbon fibers, thermal expansion during molding can be inhibited, and the strength of the molded product can also be enhanced. This carbon fiber may be pitch-based carbon fiber, rayon-based carbon fiber, polyacrylonitryl-based carbon fiber and so on, and each of these may be used independently or as a combination of two or more kinds of these fibers.

Moreover, the carbon fiber surface in the non-woven fabric can be used after its surface treatment with the thermo-setting resin mentioned above without departing from the scope of the weights of the conductive particles in the sheet molding material. In this case, the thermo-setting resin not only acts as a binder between the non-woven fabric and the carbon fibers in the sheet molding material, but also exhibits the effect of a binder for the carbon material in the bipolar plate when molding the sheet molding material mentioned later to bipolar plate shape. For example, after immersing the non-woven fabric in a resin solution diluted with a solvent containing epoxy resin and curing agent, or after coating the non-woven fabric with the said resin solution by spray or other method, the solvent is removed; thus, the non-woven fabric can be surface treated.

Next, the conductive particle layer formed by particles including conductive particles that constitute the sheet molding material of the present invention is described here.

Figure 7:
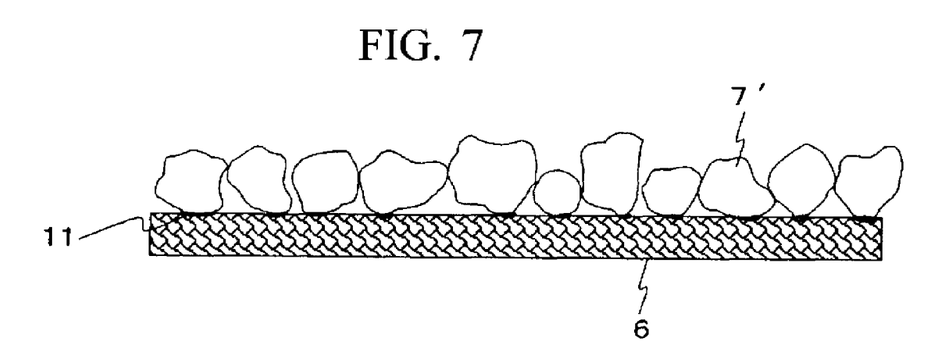
FIG. 7 is a schematic cross sectional view of the sheet molding material for molding fuel cell bipolar plate.

According to the present invention, a sheet molding material for a fuel cell bipolar plate includes one conductive particle layer which comprises particles including conductive particles which are attached to or inserted in a resin sheet having no void or having voids on at least one surface of the resin sheet; more specifically, it is as illustrated in FIG. 7.

The particle layer should preferably contain more than 75% by weight of conductive particles for conductivity; most preferably it should be 100% by weight.

This particle layer may be formed as a layer on the surface of the resin sheet. Even if it is attached to the resin sheet and formed on the surface of this sheet, the particles may be inserted in the voids opened out on the surface of the resin sheet and formed as a layer on the resin sheet.

If the particles are not attached to the surface of the resin sheet but exist in the opened out voids, then a constant relationship must exist between the mean pore diameter of the voids in the resin sheet mentioned above and the mean particle diameter of the conductive particles. This relationship is as described about the size of the voids mentioned above.

Conductive particles may be for example, carbon particles, metallic particles, metallic compounds; one, two or more kinds of these conductive particles may be combined and used. Moreover, non-conductive particles or semi conductive particles may be mixed and used as the conductive particles mentioned above, in the present invention.

Calcium carbonate, silica, kaolin, clay, talc, mica, glass flakes, glass beads, glass powder, hydrotalcite, wollastonite, and so on, are examples of non-conductive particles.

Examples of semi conductive particles include zinc oxide, tin oxide, and titanium oxide.

Examples of the carbon particles mentioned above include artificial graphite, natural graphite, glass-like carbon, carbon black, acetylene black, and Ketjen black. These carbon particles may be used independently or used after combining two or more kinds of carbon particles. There are no limitations in particular in the shape of these carbon particles; they may be in the form of foil, flake, sheet, needle, sphere, or formless. Moreover, expanded graphite obtained after chemically processing graphite may also be used. Considering conductivity, artificial graphite, natural graphite, and expanded graphite are preferred because even with a small quantity, bipolar plate with high level of conductivity can be obtained.

Examples of the metal and metallic compound mentioned above include for example, aluminum, zinc, iron, copper, gold, stainless steel, palladium, titanium, and also borides of titanium, zirconium, hafnium and so on. These metals and metallic compounds may be used independently or used after combining two or more kinds thereof. There are no limitations in particular in the form of these metals and metallic compounds; they may be in the form of foil, flake, sheet, needle, sphere, or formless. Furthermore, these metals and metallic compounds that cover the surface of particles of non-conductive or semi conductive materials may also be used.

As far as the size of conductive particles is such that they can be uniformly distributed on resin sheet, there are no limitations in particular. However, considering the mechanical properties and conductivity of bipolar plate for fuel cell obtained by molding, the mean particle diameter should preferably be in the range of 1 to 800 μm, and particularly more preferable in the range of 50 to 600 μm.

Methods of measurement of particle diameter of conductive particles include laser diffraction method and sieve method.

The laser diffraction method makes use of the fact that the strength distribution of diffracted light of particles is a function of the particle diameter. More specifically, suspended liquid wherein carbon powder is dispersed, is made to flow in the laser light path; the diffracted light from the particles passing through consecutively is taken as planar wave by the lens, and the strength distribution in the radial direction is projected in the photo detector with the rotating slit and detected.

Carbon fibers can be used together provided the uniformity of dispersion and uniformity of distribution on the surface of the sheet of conductive particles is not lost. With the combined used of these carbon fibers, the elastic modulus of the bipolar plate can be improved.

From the aspects of making the distribution of conductive particles and carbon fibers on the surface of the sheet molding material uniform, the fiber length of carbon fibers of less than 3 mm, more preferably, less than 1.0 mm are used.

To minimize the thickness variation of molded products, the relationship of the apparent mean thickness of the sheet molding material of the present invention with respect to the mean particle diameter of the conductive particles should preferably be 0.1 to 0.6 mm, and more preferably should be 0.1 to 0.4 mm.

Next, the method of production of the sheet molding material for fuel cell bipolar plate of the present invention is described here.

The methods of production of sheet molding material for fuel cell bipolar plate of the present invention include for example: (a) method of attaching conductive particles to resin sheet without using adhesive; (b) method of bonding conductive particles to resin sheet through adhesive. From these methods, the method in (a) is preferred because the content of conductive particles is high and high conductivity can be obtained.

Next, the method of production of the sheet molding material for fuel cell bipolar plate of the present invention as mentioned in (a) above, is described in further detail.

That is, this method of production is accomplished by sequentially implementing Step (1), Step (2) and Step (3) given below for one surface of the resin sheet.

Step (1) is a step by which conductive particles are uniformly dispersed on the resin sheet surface.

The dispersion method should preferably disperse the conductive particles over the surface of the resin sheet such that the entire surface is covered, and such that the contact area between the conductive particles and the resin sheet becomes as large as possible.

More specifically, the dispersion method for the conductive particles is not particularly limited. Examples include: (A1) the method of dispersing the required amount of conductive particles using a dispersion device having a plurality of nozzles, or (A2) the method of placing a large amount of conductive particles on one end of the resin sheet surface, and then spreading them uniformly over the entire surface of the resin sheet using a squeegee board. The method in (A2) is preferable since a uniform layer of conductive particles with no irregularities can be obtained. In this case, dispersion of an amount of conductive particles equivalent to twice the amount planned for attachment is preferable.

Figures 4A, 4B:
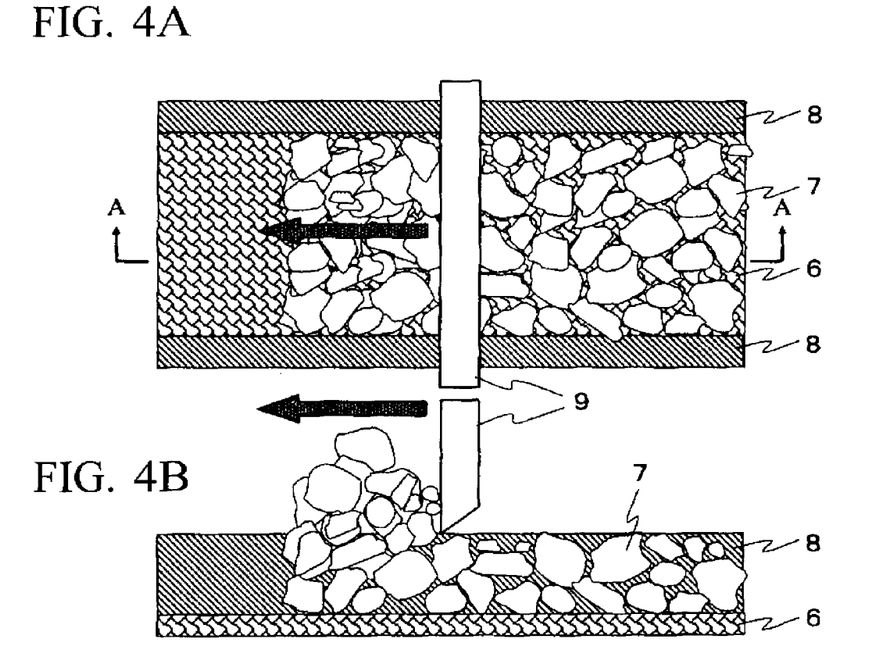
FIG. 4A shows the plan view and FIG. 4B shows the cross-sectional view (A-A) of the resin sheet that shows the state of the particles spread out over the entire surface of the squeegee board.

FIGS. 4A and 4B are a conceptual sketch that shows Step (1) for dispersing the conductive particles 7 on one surface of the resin sheet 6.

The method in (A2) above is described here referring to FIGS. 4A and 4B. The conductive particles are placed on the resin sheet 6. Next, the conductive particles are spread out all over the surface of the resin sheet 6. Various methods may be employed to spread the conductive particles. For example, a spacer 8 may be placed on both sides (top, bottom or left, right) of the resin sheet 6 at a height of 3 to 10 times the mean diameter of the conductive particles, and from one side of the spacer a squeegee board 9 may be used along the other side to spread the conductive particles uniformly over the entire surface of the resin sheet 6. By spreading the conductive particles over the entire surface of the sheet 6 using the squeegee board 9, a uniform layer of the conductive particles is formed on the resin sheet 6 having a constant thickness.

In the method of using an adhesive mentioned in (b) above, before dispersing the conductive particles on the surface of the resin sheet, the adhesive is coated beforehand.

The compounds that can be used as adhesive is not particularly limited; water-based, solvent-based or non-solvent-based adhesive may be used.

Non-solvent-based adhesive should be in liquid form at room temperature; in this case, it should preferably be thermo-setting resin in liquid form. If water-based and solvent-based adhesives are used, after coating these adhesives on the resin sheet, conductive particles are dispersed on them, heated, and pressure is reduced so as to bond the particles. Whatever be the kind of adhesive used, it should be thermally stable at the melting point temperature of the resin sheet.

Examples of adhesives with excellent adhesion to both resin sheet and conductive particles are preferred and these include compounds that contain independent or two or more functional groups such as carboxyl group, hydroxyl group, amino group, sulfone group, and phosphate group.

In the method where adhesive is used, molding material that has adhesive layer and a layer of conductive particles on the surface of the resin sheet is obtained.

Step (2) is a step of attaching a part of the conductive particles to the resin sheet mentioned above.

Methods for attaching the conductive particles to the resin sheet after dispersing the conductive particles on the surface of the resin sheet include: (B1) pressing the conductive particles on the resin sheet using pressurizing roll or press and attaching the conductive particles to the resin sheet; (B2) method wherein the conductive particles are pressed on the resin sheet such that the conductive particles and fibers become entangled when fibers such as non-woven fabric form the resin sheet, (B3) method wherein heat is applied to the resin sheet and/or conductive particles, the entire resin sheet or part thereof is melted, and after cooling, the conductive particles are attached to the resin sheet by thermal bonding when the resin sheet is made soft or melted by heating. The methods (B1) to B(3) mentioned above, may be combined also.

Examples of the thermal bonding method mentioned in (B3) above, include heating by calendar roll, hot-air heater, infrared heater, water vapor and so on, but in the present invention, heating by calendar roll or infrared heater is preferred because flying out of conductive particles can be prevented.

Figure 5:
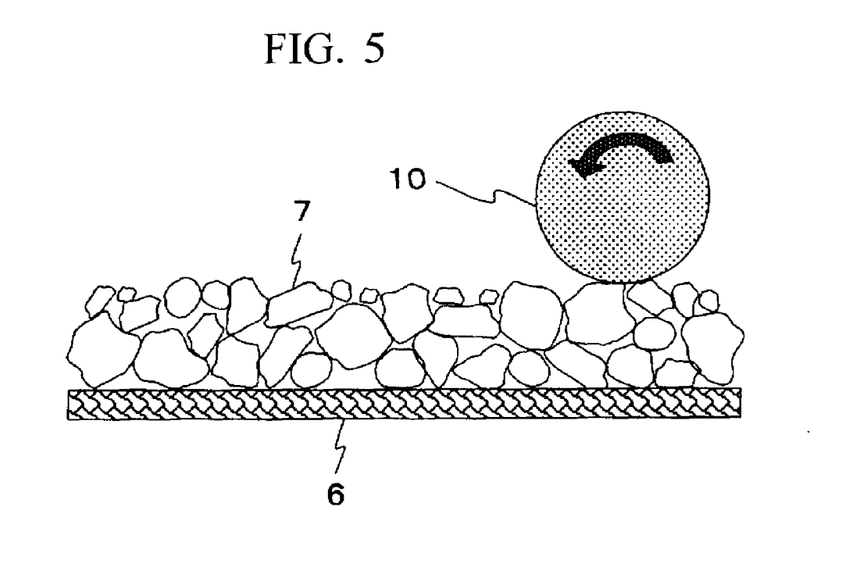
FIG. 5 is a conceptual sketch showing the state of attachment of a part of the graphite particles mentioned above to the resin sheet.

The method of calendar roll heating is described here in detail based on FIG. 5. First, the calendar roll 10 is heated to a high temperature between 5° C. and 20° C. by the heat-softening temperature of the resin sheet 6, and passed over the lamination of the resin sheet 6 and the conductive particles 7 kept ready in the step (1) while touching the conductive particles 7. The heat from the heated calendar roll is transmitted to the conductive particles 7, and localized melting of the resin sheet 6 in contact with conductive particles 7 occurs because of the heat accumulated in the conductive particles. Next, the melted resin sheet 6 cools naturally, and the conductive particles 7 in contact with the resin sheet 6 fuse and attach to resin sheet 6.

This method of calendar roll heating does not heat the entire resin sheet 6, but only locally heats the resin sheet 6 in contact with the conductive particles 7. Since heat is not transmitted to the rest of the parts, expansion/contraction of the resin sheet 6 due to heat does not occur. Therefore, this method is preferred because a more uniform sheet molding material can be obtained. In this case, if the pressing-down force of the calendar roll is less than 5 kgf/cm, the conductive particles can stick to the resin sheet without breaking up. When the step (2) completes, the conductive particles attach to the resin sheet and exist, whereupon sheet molding material precursor for fuel cell bipolar plate with conductive particles not attached to the resin sheet can be obtained.

In step (1), in the method of coating the adhesive on the resin sheet beforehand as mentioned in (b), and in step (2), when thermo-setting resin in liquid form is used as an adhesive, for example, the conductive particles touching this resin is brought into contact with the resin sheet using the calendar heating method and so on; as a result, a part of the conductive particles can be made to attach to the resin sheet.

Step (3) is a step of removing the conductive particles not attached to the resin sheet in the step (2) mentioned above. Conductive particles not directly attached to the resin sheet 6 do not melt. By removing these not melted conductive particles, the sheet molding material with particle layer of conductive particles of the present invention can be obtained.

Examples of method of removing the conductive particles that are not attached to the resin sheet include: (C1) the method wherein the top and bottom of the sheet molding material precursor for fuel cell bipolar plate mentioned above, are turned over and the conductive particles not attached to the resin sheet are made to fall off from the top of the resin sheet; (C2) the method of sucking and removing conductive particles not attached to the resin sheet using suction nozzles from above the relevant precursor; and (C3) the method of blowing off and removing the conductive particles not attached to the resin sheet by blowing air from the top of the relevant precursor.

Figure 6:
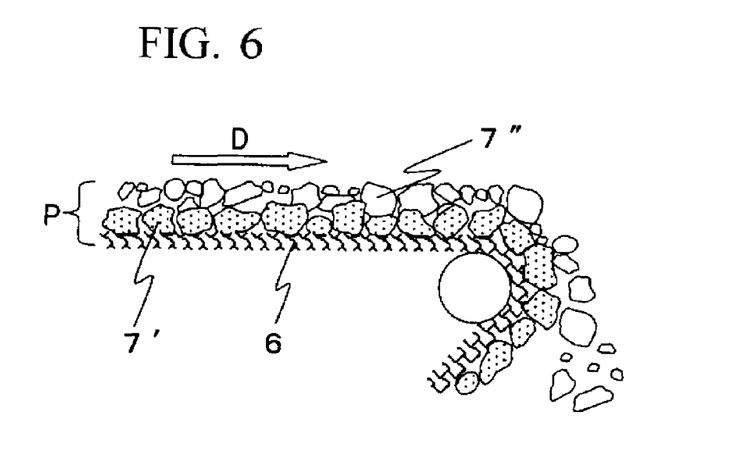
FIG. 6 is a conceptual sketch of a device that removes the non-attached graphite particles from the precursor sheet molding material for molding fuel cell bipolar plate.

If the device shown in FIG. 6 is used for the sheet molding material precursor of the fuel cell bipolar plate in the method of (C1) mentioned above, the conductive particles not attached continuously can be removed from the relevant precursor. The conductive particles so removed can be recovered and reused.

The reference numeral 11 in FIG. 7 is the thermally bonded part of the thermoplastic resin sheet 6 and the conductive particles 7.

By implementing Step (1), Step (2) and Step (3) sequentially, sheet molding material for fuel cell bipolar plate whereupon conductive particles in layer form are attached to one surface of the resin sheet can be produced.

If a layer of conductive particles is to be formed on the other surface of the resin sheet also, the bottom and top of the sheet molding material obtained in the step mentioned above, may be turned over, and Step (1), Step (2) and Step (3) may be sequentially implemented.

The method of production of sheet molding material of the present invention includes intrusion in the resin sheet, attachment of conductive particles by thermal bonding or adhesion, and adoption of molding method for the sheet molding material; therefore, the conductive particles used as raw material in each step are almost never crushed, and the diameter of the particles is easily retained.

According to the method of the present invention, by appropriately selecting the size and form of the conductive particles and the surface area of the resin sheet, the amount of conductive particles that attach to the resin sheet can be designed. The amount of conductive particles that attach to the resin sheet per unit surface area is governed by the surface area of the resin sheet and the size and form of the conductive particles; therefore, by using the normally-used resin sheet and conductive particles, sheet molding material for fuel cell bipolar plate can be produced having very little variation in thickness of the sheet molding material and in the amount of conductive particles attached to the resin sheet.

The bipolar plate for fuel cell of the present invention can be obtained by molding one or a plurality of sheet molding materials obtained after passing through each of the processes mentioned above.

Examples of this molding method include press molding which has been implemented conventionally, and stampable molding. Sheet molding material may be made from thermoplastic resin or from thermo-setting resin; details are described below.

When the sheet molding material is made from thermoplastic resin, at least one sheet molding material mentioned above is installed in a cavity mold provided with the form of the bipolar plate. In this case, the mold temperature should preferably be below the melting point of the resin sheet. If the mold temperature is greater than the melting point of the resin sheet, and if the sheet molding material is installed in the mold, then the sheet deforms, such as by shrinkage within a short time, and the partial distribution of the resin and the conductive particles tends to become non-uniform, which is not preferred.

Next, the core mold is installed in the above-mentioned sheet molding material, and while pressing the sheet molding material with the core mold and cavity mold at a pressure of 0.05 MPa to 10 MPa, the temperature is raised to above the melting point of the resin sheet using a heating press and the like. Then, while cooling it so that the mold temperature is below the melting point of the resin sheet, using a cooling press and the like to a temperature preferably below the melting point such as 50° C., a pressure between 0.5 MPa and 100 MPa is applied on the sheet molding material. After the mold is cooled, the pressure is reduced and the bipolar plate is taken out of the mold.

When the sheet molding material is made of thermo-setting resin, the bipolar plate is manufactured by the method of compression molding of the sheet molding material using the bipolar plate mold heated to the curing temperature of the thermo-setting resin. The molding pressure in this case is selected appropriately from the range of 0.5 MPa to 100 MPa.

Considering the state of melting and pressurizing of the resin of the above-mentioned sheet molding material, the pressure load from the press is transmitted to the molten resin through the conductive particles, which are solids, and the molten resin disposed between conductive particles in the pressure load direction is pushed out directly in the pressure load direction by the pressure.

Figure 8A:
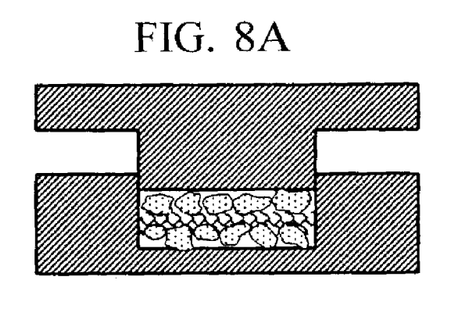
FIG. 8A: Non-pressurized.
Figure 8B:
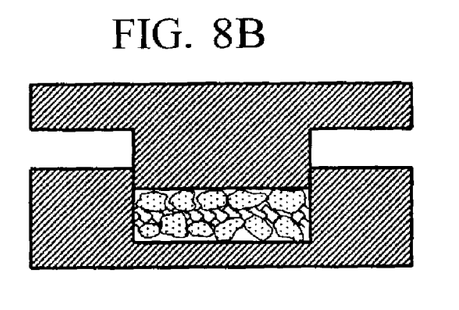
FIG. 8B: During pressurization.
Figure 8C:
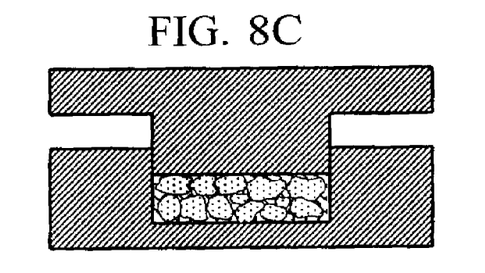
FIG. 8C: Final stage of pressurization.

That is, the resin in the sheet molding material that exists as insulating layer before pressurization, is pushed out into the void parts formed between the conductive particles in the pressurization stage, and thus the conductivity in the thickness direction of the bipolar plate can be ensured. (Refer to FIGS. 8A to 8C.)

According to prior art, it was difficult to mold bipolar plate to a thickness below 1 mm, but since the apparent thickness of the sheet molding material of the present invention is in the range of 0.1 mm to 0.6 mm, by laminating the sheets, a thin bipolar plate of less than 1 mm and with small thickness variation can be obtained.

The thickness variation of bipolar plate obtained by molding the sheet molding material of the present invention should preferably be less than 15 μm.

The conductive particles of the bipolar plate for fuel cell molded using the sheet molding material of the present invention can be uniformly distributed with a high density, particularly in a thermoplastic resin matrix. As a result, a bipolar plate with excellent conductivity can be obtained.

Generally, when forming a bipolar plate for fuel cell, the mean particle diameter of the conductive particles used as raw material should preferably be retained as far as possible in the bipolar plate for the fuel cell obtained finally from the aspects of conductivity of the bipolar plate for fuel cell. From these aspects, the mean particle diameter of the conductive particles included in the bipolar plate for fuel cell finally obtained should preferably be greater than 60% of the mean particle diameter before molding the resin sheet, and more preferably greater than 70%, and even more preferably greater than 80%.

The bipolar plate for fuel cell mentioned above is a basic configuration unit of the fuel cell, that is, it can naturally be used in a fuel cell made of only unit cells. However, this unit cell can also be used in a fuel cell stack made of a plurality of unit cells.

The fuel cell is a power generating device wherein hydrogen obtained after reforming fossil fuel is used as the main fuel. It extracts the energy created by the electrochemical reaction between this hydrogen and oxygen as power. Generally, the power is generated by a stack construction wherein a plurality of unit cells are stacked in series with collector plates installed at both ends of the stack to collect current.

Figure 9:
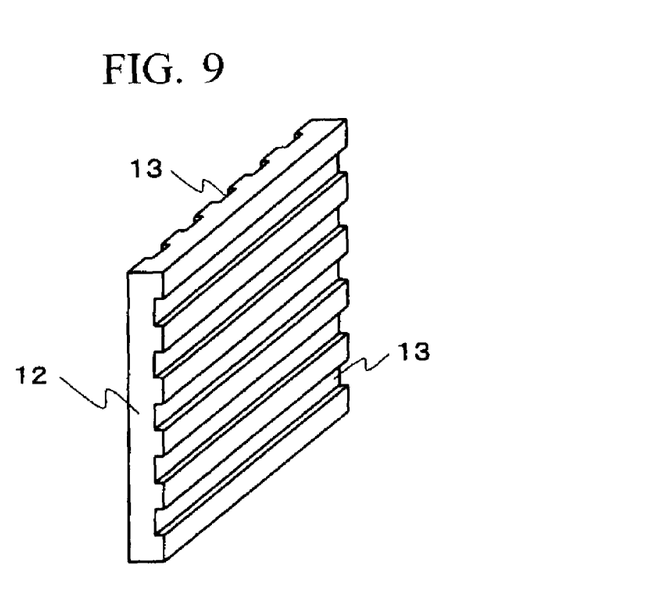
FIG. 9 is a partial perspective view showing the bipolar plate for fuel cell of the present invention.

The form of the bipolar plate for fuel cell obtained in this present invention is not limited particularly; it may be for example, the bipolar plate for fuel cell shown in FIG. 9. In FIG. 9, a bipolar plate with a form having flow passage 13 for gas or liquid on one surface or both surfaces is shown.

The sheet molding material for fuel cell bipolar plate of the present invention is particularly suitable for producing fuel cell bipolar plate having this construction, that is, having a ribbed form.

More specifically, the bipolar plate for fuel cell of the present invention may be used as the bipolar plate for the hydrazine type, direct methanol type, alkali type, polymer electrolyte type, and phosphate type fuel cells.

The fuel cell obtained by using the bipolar plate for fuel cell of the present invention can be made highly resistant to impact and also small; therefore, in addition to electric automotive power source, portable power source, and emergency power source, it can be used in various other portable power sources such as man-made satellites, airplanes, space ships and so on.

EMBODIMENTS

Next, the modes of the present invention are described by embodiments. In the embodiments and comparative examples, unless otherwise specified, "part" and "%" refer to "weight" and "percentage weight."

Embodiment 1

5 g of artificial graphite (formless, mean particle diameter of 88 μm) particles were dispersed on PPS fiber non-woven fabric of size 150 mm×150 mm (weight of 15 g/m² thickness of 60 μm, mean pore diameter of void 38 μm, preferred void fraction of 85%, softening temperature of 260° C.). Next, a spacer of height 0.8 mm was placed at both ends of the non-woven fabric, a squeegee board was moved from one side of the spacer along the other side, and the artificial graphite particles were spread over the entire surface of the non-woven fabric.

Next, calendar roll preheated to 265° C. to 280° C. was moved from one side to the other side while pressing it on the graphite side of the non-woven fabric mentioned above. Next, after natural cooling, air was blown at 5 kgf/cm², and the graphite that had not fused together with the non-woven fabric fibers was removed. As a result, sheet molding material with an apparent thickness of 0.15 mm, weight of 75 g/m², and void fraction of about 73% was obtained.

A stack of 20 sheets of the sheet molding material mentioned above was heated in a heating furnace to 300° C., PPS fiber was melted and supplied immediately to a mold heated to 150° C. and attached to a press molding machine. By pressurizing to 40 MPa, the sheet was shaped, cooled and solidified, and a ribbed molded product with width of 15 cm, mean thickness of 1.09 mm, and length of 15 cm was obtained in the form shown in FIGS. 10A and 10B. The molding cycle was 30 seconds.

Similar operation as mentioned below was performed and a flat molded product of width 15 cm, thickness of about 1 mm, and length of 15 cm was molded.

The specific volume resistance of the molded product was 6 mΩ·cm, the bending strength was 53 MPa, the thickness variation was 0.009 mm, and the mean particle diameter of graphite in the molded product was 81 μm.

Embodiment 2

PPS fiber non-woven fabric (weight of 20 g/m², thickness of 80 μm, mean pore diameter of void of 38 μm, void fraction of 85%) was used, and similar procedure was performed with the same raw materials, method, and conditions as in embodiment 1 to obtain sheet molding material with apparent thickness of 0.16 mm, weight of 80 g/m², and void fraction of approximately 75%.

Figure 10A:
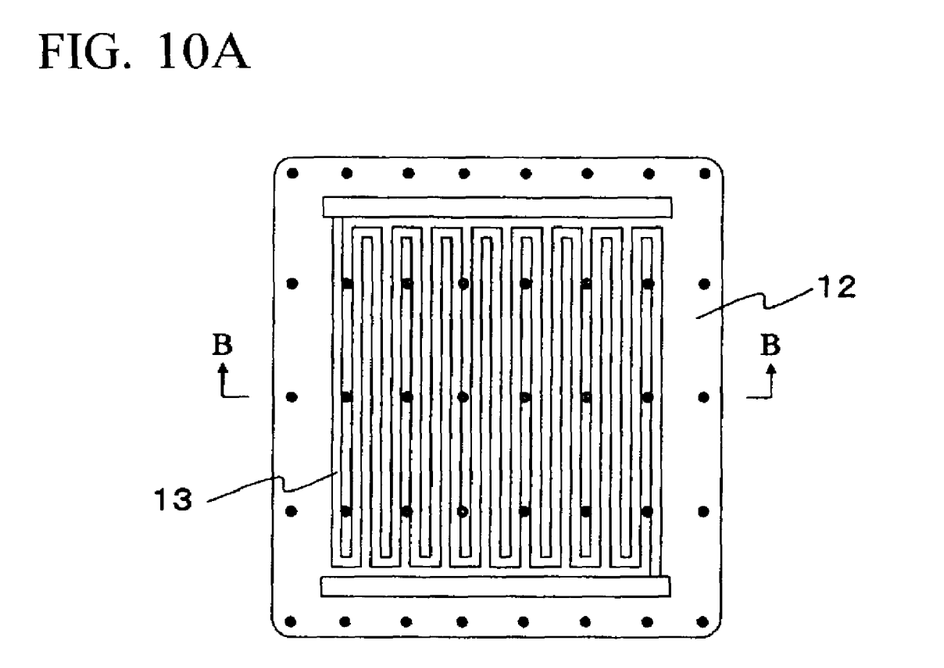
FIGS. 10A and 10B show the plan view and the cross sectional view of the bipolar plate for fuel cell for which thickness measurement points have been entered, respectively.
Figure 10B:
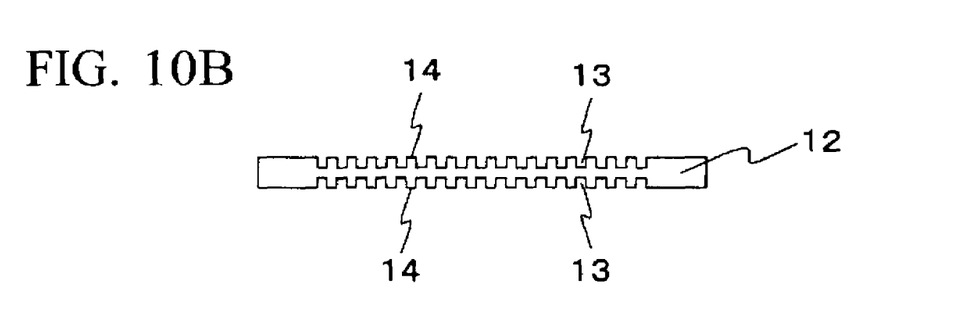

The same procedure as in embodiment 1 was carried out using this sheet molding material, and ribbed molded product of width of 15 cm, mean thickness of 1.1 mm, and length 15 cm having the form shown in FIGS. 10A and 10B was obtained. The molding cycle was 30 seconds.

Using the obtained sheet molding material, the same procedure described above was carried out and a flat molded product of width 15 cm, thickness of about 1 mm, and length of 15 cm was molded.

The specific volume resistance of the molded product was 16 mΩ·cm, the bending strength was 60 MPa, the thickness variation was 0.007 mm, and the mean particle diameter of graphite in the molded product was 83 μn.

Embodiment 3

PPS fiber non-woven fabric (weight of 25 g/m$^2$, thickness of 100 μm, mean pore diameter of void of 38 μm, void fraction of 85%) was used, and similar procedure was performed with the same raw materials, method, and conditions as in embodiment 1 to obtain sheet molding material with apparent thickness of 0.17 mm, weight of 85 g/m$^2$, and void fraction of approximately 77%.

The same procedure as in embodiment 1 was carried out using this sheet molding material, and ribbed molded product of width of 15 cm, mean thickness of 1.1 mm, and length 15 cm having the form shown in FIGS. 10A and 100B was obtained. The molding cycle was 30 seconds.

Using the obtained sheet molding material, the same procedure described above was carried out and a flat molded product of width 15 cm, thickness of about 1 mm, and length of 15 cm was molded.

The specific volume resistance of the molded product was 17 mΩ·cm, the bending strength was 64 MPa, the thickness variation was 0.007 mm, and the mean particle diameter of graphite in the molded product was 83 μm.

Embodiment 4

Instead of PPS fiber non-woven fabric, PP/PE fiber non-woven fabric (weight of 10 g/m$^2$, thickness of 45 μm, mean pore diameter of void of 37 μm, void fraction of 85%, softening temperature of 100° C.) was used. Other than changing the calendar roll temperature for heating up to 140° C., the operation was carried out by a similar method and under similar conditions as embodiment 1, and sheet molding material of an apparent thickness of 0.15 mm, weight of 70 g/m$^2$, and void fraction of about 75% was obtained.

A stack of 22 sheets of this sheet molding material was heated in a heating furnace to 185° C., polyolefin resin fiber was melted and supplied immediately to a mold heated to 80° C. and attached to a press molding machine. By pressurizing to 40 MPa, the sheet was shaped, cooled and solidified, and a ribbed molded product with width of 15 cm, mean thickness of 0.97 mm, and length of 15 cm was obtained in the form shown in FIGS. 10A and 10B. The molding cycle was 30 seconds.

Using the obtained sheet molding material, the same procedure described above was carried out and a flat molded product of width 15 cm, thickness of about 1 mm, and length of 15 cm was molded.

The specific volume resistance of the molded product was 8 mΩ·cm, the bending strength was 40 MPa, the thickness variation was 0.01 mm, and the mean particle diameter of graphite in the molded product was 81 μm.

Embodiment 5

PP/PE fiber non-woven fabric (weight of 15 g/m$^2$, thickness of 68 μm, mean pore diameter of void of 37 μm, void fraction of 85%, softening temperature of 100° C.) was used, and the operation was carried out by a similar method and under similar conditions as embodiment 1, and sheet molding material of an apparent thickness of 0.16 mm, weight of 75 g/m$^2$, and void fraction of about 77% was obtained.

A stack of 22 sheets of this sheet molding material was heated in a heating furnace to 185° C., polyolefin resin fiber was melted and supplied immediately to a mold heated to 80° C. and attached to a press molding machine. By pressurizing to 40 MPa, the sheet was cooled and solidified, and a ribbed molded product with width of 15 cm, mean thickness of 0.99 mm, and length of 15 cm was obtained in the form shown in FIGS. 10A and 10B. The molding cycle was 30 seconds.

Using the obtained sheet molding material, the same procedure described above was carried out and a flat molded product of width 15 cm, thickness of about 1 mm, and length of 15 cm was molded.

The specific volume resistance of the molded product was 10 mΩ·cm, the bending strength was 43 MPa, the thickness variation was 0.009 mm, and the mean particle diameter of graphite in the molded product was 80 μm.

Embodiment 6

Based on the production method of the sheet molding material mentioned above, which is b) the method of bonding conductive particles on the resin sheet through adhesive, Epicron 830 (epoxy resin of viscosity 4000 mPa·s made by Dainippon Ink and Chemicals, Incorporated (registered trademark)) was coated on PP/PE non-woven fabric (weight of 5 g/m$^2$, thickness of 20 μm, mean pore diameter of void of 37 μm, void fraction of 80%) of size 150 mm×150 mm such that epoxy resin coating became 15 g/m$^2$ under the environment of ambient temperature 40° C., and on top of it, 5 g of artificial graphite particles (formless, mean particle diameter of 88 μm) was dispersed. Next, a spacer of 0.8 mm height was placed at both ends of the non-woven fabric, a squeegee board was moved along one side of the spacer from the other side such that the artificial graphite was spread out over the entire surface of the non-woven fabric coated with epoxy resin. Subsequently, by removing graphite particles not bonded to the non-woven fabric, a composite sheet of non-woven fabric, epoxy resin and graphite particles was obtained.

This composite sheet was placed for 2 hours in a drying oven of 60° C., and graphite not bonded to non-woven fabric fiber was removed to obtain sheet molding material with apparent thickness of 0.15 mm, and weight of 75 g/m$^2$.

A stack of 20 sheets of this sheet (150 mm×150 mm) was charged in a mold preheated to 150° C., and pressurized with 40 MPa to obtain a ribbed molded product with width of 15 cm, mean thickness of 1.06 mm, and length of 15 cm. The molding cycle was 45 minutes.

Similar operation as mentioned below was performed and a flat molded product of width 15 cm, thickness of about 1 mm, and length of 15 cm was molded. The specific volume resistance of the molded product was 22 mΩ·cm, the bending strength was 44 MPa, the thickness variation was 0.011 mm, and the mean particle diameter of graphite in the molded product was 80 μm.

Comparative Example 1

70 parts of artificial graphite similar to the artificial graphite used in embodiment 1, and 30 parts of PPS were dry blended for 10 minutes using a mixer. This mix was press molded using rolls under conditions of 20 MPa molding pressure and 320° C. to obtain stampable sheet of thickness 4 mm.

The stampable sheet obtained was cut to the desired size (120 mm×120 mm), heated for 10 minutes at 320° C. in a heating furnace, PPS was melted, and immediately supplied to a mold heated to 150° C. attached to a press molding machine. The sheet was then shaped, cooled and solidified by pressurizing it to 40 MPa to obtain a ribbed molded product of width 15 cm, mean thickness of 1.1 mm, and length of 15 cm. The molding cycle was 30 seconds. Similarly, a flat molded product of width 15 cm, thickness of about 1 mm and length of 15 cm was molded. The specific volume resistance of the molded product was 116 mΩ·cm, the bending strength was 61 MPa, the thickness variation was 0.110 mm, and the mean particle diameter of graphite in the molded product was 14 μm.

Comparative Example 2

60 parts of artificial graphite similar to the artificial graphite used in embodiment 1, and 40 parts of Epicron 830 were mixed and stirred adequately for 2 minutes under an ambient temperature of 40° C., and a uniformly dispersed body was prepared. Using a squeegee board on one surface of the PP/PE fiber non-woven fabric (weight of 10 g/m$^2$, thickness of 45 μm, mean pore diameter of void of 37 μm, void fraction of 85%, softening temperature of 100° C.) used in the embodiment 3 mentioned above, the obtained dispersed body was coated so that it became 90 g/m$^2$, and resin sheet (graphite content: 54%) was obtained. This resin sheet was semi-cured for 2 hours in a drying oven at 60° C. A stack of 20 sheets of this sheet (150 mm×150 mm) was charged in a mold preheated to 150° C., and pressurized with 40 MPa to obtain a ribbed molded product with width of 15 cm, mean thickness of 1.27 mm, and length of 15 cm. The molding cycle was 45 minutes. Similarly, a flat molded product of width 15 cm, thickness of about 1 mm and length of 15 cm was molded. The specific volume resistance of the molded product was 466 mΩ·cm, the bending strength was 46 MPa, the thickness variation was 0.165 mm, and the mean particle diameter of graphite in the molded product was 80 μm.

Comparative Example 3

40 parts of artificial graphite similar to the artificial graphite used in embodiment 1 and 60 parts of Epicron 830 with a viscosity of 4000 mPa·s were mixed and stirred adequately for 2 minutes at an ambient temperature of 40° C., and a uniformly dispersed body was prepared. Using a squeegee board on one surface of the PP/PE fiber non-woven fabric (weight of 10 g/m$^2$, thickness of 45 μm, mean pore diameter of void of 37 μm, void fraction of 85%, softening temperature of 100° C.) used in the embodiment 3 mentioned above, the obtained dispersed body was coated so that it became 90 g/m$^2$, and resin sheet (graphite content: 36% by weight) was obtained. This resin sheet was semi-cured for 2 hours in a drying oven at 60° C. A stack of 20 sheets of this sheet (150 mm×150 mm) was charged in a mold preheated to 150° C., and pressurized with 40 MPa to obtain a ribbed molded product with width of 15 cm, mean thickness of 1.25 mm, and length of 15 cm. The molding cycle was 45 minutes. Similarly, a flat molded product of width 15 cm, thickness of about 1 mm and length of 15 cm was molded. The specific volume resistance of the molded product was 783 mΩ·cm, the bending strength was 49 MPa, the thickness variation was 0.143 mm, and the mean particle diameter of graphite in the molded product was 80 μm.

When the sheet molding material for fuel cell bipolar plate of the present invention is used, fuel cell bipolar plate with excellent conductivity, small thickness and high thickness precision can be produced easily.

TABLE 1

| Table 1 | | Embodiments | | | | | | Comparative Examples | | |
|---|---|---|---|---|---|---|---|---|---|---|
| | | 1 | 2 | 3 | 4 | 5 | 6 | 1 | 2 | 3 |
| Graphite (%) | | 80 | 75 | 70 | 85 | 80 | 80 | 70 | 54 | 36 |
| PPS (%) | | — | — | — | — | — | — | 30 | — | — |
| Thermoplastic Resin non-woven fabric (%) | | PPS 20 | PPS 25 | PPS 30 | PP/PE 15 | PP/PE 20 | PP/PE 5 | — | PP/PE 10 | PP/PE 10 |
| Epoxy Resin (%) | | — | — | — | — | — | 15 | — | 36 | 54 |
| Molding Product | Specific Volume Resistance (mΩ · cm) | 6 | 16 | 17 | 8 | 10 | 22 | 116 | 466 | 783 |
| | Bending Strength (Mpa) | 53 | 60 | 64 | 40 | 43 | 44 | 61 | 46 | 49 |
| | Mean Thickness (mm) | 1.09 | 1.1 | 1.1 | 0.97 | 0.99 | 1.06 | 1.1 | 1.27 | 1.25 |
| | Thickness Variation (μm) | 9 | 7 | 7 | 10 | 9 | 11 | 110 | 165 | 143 |
| Partical Diameter of Graphite | Mean Particle Diameter before molding (μm) | 88 | 88 | 88 | 88 | 88 | 88 | 88 | 88 | 88 |
| | Mean Particle Diameter after molding (μm) | 81 | 83 | 83 | 81 | 80 | 80 | 14 | 80 | 80 |

The invention claimed is:

1. A sheet molding material for a fuel cell bipolar plate, comprising:
   a resin sheet having voids; and
   one conductive particle layer formed on said resin sheet, said one conductive particle layer comprising particles having conductive particles attached to the resin sheet on at least one surface of the resin sheet or inserted in the voids opened out on the surface of the resin sheet;
   wherein content of the conductive particles in the sheet molding material is 70% to 95% by weight, and
   wherein said conductive particle layer formed on said resin sheet is obtained by:
      uniformly dispersing the conductive particles on the resin sheet surface, then
      attaching a part of the conductive particles to the resin sheet, and then
      removing conductive particles that are not attached to the resin sheet.

2. The sheet molding material for a fuel cell bipolar plate according to claim 1, wherein content of the conductive particles in the one conductive particle layer is greater than 75% by weight.

3. The sheet molding material for a fuel cell bipolar plate according to claim 1, wherein a void fraction of the resin sheet is 30% to 90%.

4. The sheet molding material for a fuel cell bipolar plate according to claim 1, wherein a mean pore diameter of the voids of the resin sheet is 10 µm to 800 µm.

5. The sheet molding material for a fuel cell bipolar plate according to claim 1, wherein resin of the resin sheet is thermoplastic resin.

6. The sheet molding material for a fuel cell bipolar plate according to claim 1, wherein the resin sheet is a non-woven fabric.

7. The sheet molding material for a fuel cell bipolar plate according to claim 1, wherein the conductive particles are graphite.

8. The sheet molding material for a fuel cell bipolar plate according to claim 1, wherein a mean thickness of said sheet molding material is 0.1 mm to 0.6 mm.

9. A method of producing a sheet molding material for a fuel cell bipolar plate, comprising:
   uniformly dispersing conductive particles on a resin sheet surface, then;
   attaching a part of the conductive particles to the resin sheet, then;
   removing conductive particles that are not attached to the resin sheet.

10. The method of producing a sheet molding material for a fuel cell bipolar plate according to claim 9, further comprising:
    spreading the dispersed conductive particles over the entire resin sheet surface, after uniformly dispersing conductive particles on the resin sheet surface.

11. The method of producing a sheet molding material for a fuel cell bipolar plate according to claim 9,
    wherein resin in the resin sheet is thermoplastic resin, and
    wherein attaching the part of the conductive particles to the resin sheet comprises thermally bonding the part of the conductive particles on the resin sheet by heating the resin sheet.

12. The method of producing a sheet molding material for a fuel cell bipolar plate according to claim 9, wherein the resin sheet has voids.

13. The method of producing a sheet molding material for a fuel cell bipolar plate according to claim 9, wherein the conductive particles are graphite.

14. A fuel cell bipolar plate formed by molding the sheet molding material according to claim 1.

15. The fuel cell bipolar plate according to claim 14, wherein thickness variation of the fuel cell bipolar plate is less than 15 µm.

* * * * *